United States Patent
Wijmans et al.

(10) Patent No.: US 9,433,887 B2
(45) Date of Patent: *Sep. 6, 2016

(54) MEMBRANE LOOP PROCESS FOR SEPARATING CARBON DIOXIDE FOR USE IN GASEOUS FORM FROM FLUE GAS

(71) Applicants: Johannes G Wijmans, Menlo Park, CA (US); Richard W Baker, Palo Alto, CA (US); Timothy C Merkel, Menlo Park, CA (US)

(72) Inventors: Johannes G Wijmans, Menlo Park, CA (US); Richard W Baker, Palo Alto, CA (US); Timothy C Merkel, Menlo Park, CA (US)

(73) Assignee: MEMBRANE TECHNOLOGY AND RESEARCH, INC., Newark, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/477,633

(22) Filed: Sep. 4, 2014

(65) Prior Publication Data
US 2014/0366724 A1    Dec. 18, 2014

Related U.S. Application Data

(63) Continuation of application No. 13/123,364, filed as application No. PCT/US2010/002479 on Sep. 13, 2010, now Pat. No. 8,852,319.

(51) Int. Cl.
| | |
|---|---|
| *B01D 53/22* | (2006.01) |
| *B01D 53/62* | (2006.01) |
| *F23L 7/00* | (2006.01) |
| *F23J 15/00* | (2006.01) |
| *F23J 15/02* | (2006.01) |

(52) U.S. Cl.
CPC ............... *B01D 53/22* (2013.01); *B01D 53/62* (2013.01); *F23J 15/006* (2013.01); *F23J 15/02* (2013.01); *F23L 7/007* (2013.01); *B01D 2256/22* (2013.01); *B01D 2257/504* (2013.01); *B01D 2311/13* (2013.01); *F23J 2215/50* (2013.01); *F23J 2219/00* (2013.01); *Y02C 10/04* (2013.01); *Y02C 10/08* (2013.01); *Y02C 10/10* (2013.01); *Y02C 20/20* (2013.01); *Y02E 20/344* (2013.01)

(58) Field of Classification Search
None
See application file for complete search history.

(56) References Cited

U.S. PATENT DOCUMENTS

| | | | |
|---|---|---|---|
| 4,931,070 A | 6/1990 | Prasad | |
| 4,936,887 A * | 6/1990 | Waldo | B01D 53/22 62/624 |
| 4,963,165 A | 10/1990 | Blume et al. | |
| 5,034,126 A | 7/1991 | Reddy et al. | |
| 5,240,471 A | 8/1993 | Barbe et al. | |
| 5,500,036 A | 3/1996 | Kalthod | |

(Continued)

FOREIGN PATENT DOCUMENTS

| | | | |
|---|---|---|---|
| WO | WO2009/139835 | * 11/2009 | ............. B01D 53/22 |

*Primary Examiner* — Daniel Berns
(74) *Attorney, Agent, or Firm* — Timothy A. Hott; Janet Farrant

(57) ABSTRACT

The invention is a process involving membrane-based gas separation for separating and recovering carbon dioxide emissions from combustion processes in partially concentrated form, and then transporting the carbon dioxide and using or storing it in a confined manner without concentrating it to high purity. The process of the invention involves building up the concentration of carbon dioxide in a gas flow loop between the combustion step and a membrane separation step. A portion of the carbon dioxide-enriched gas can then be withdrawn from this loop and transported, without the need to liquefy the gas or otherwise create a high-purity stream, to a destination where it is used or confined, preferably in an environmentally benign manner.

22 Claims, 3 Drawing Sheets

(56) References Cited

U.S. PATENT DOCUMENTS

| | | |
|---|---|---|
| 5,641,337 A | 6/1997 | Arrowsmith et al. |
| 5,681,433 A | 10/1997 | Friesen et al. |
| 5,843,209 A | 12/1998 | Ray et al. |
| 6,478,852 B1 | 11/2002 | Callaghan |
| 8,852,319 B2 * | 10/2014 | Wijmans ............ B01D 53/22 423/220 |

* cited by examiner (not in accordance with invention)

under SBIR Award No. DE-NT-000-5312, awarded
MEMBRANE LOOP PROCESS FOR SEPARATING CARBON DIOXIDE FOR USE IN GASEOUS FORM FROM FLUE GAS

CROSS-REFERENCE TO RELATED APPLICATIONS

This application is a continuation of U.S. application Ser. No. 13/123,364, filed on Apr. 8, 2011, which issued as U.S. Pat. No. 8,852,319 on Oct. 7, 2014, which is a national stage application of and claims the benefit of, PCT Application No. PCT/US2010/002479, filed on Sep. 13, 2010, the disclosures of which are hereby incorporated herein by reference in their entireties.

STATEMENT OF GOVERNMENTAL SUPPORT

The invention was made in part with U.S. Government support under SBIR Award No. DE-NT-000-5312, awarded by the U.S. Department of Energy. The U.S. Government has certain rights in this invention.

FIELD OF THE INVENTION

The invention relates to membrane-based gas separation processes, and specifically to loop processes for recycling carbon dioxide in gaseous form from flue gas, where the recovered carbon dioxide can be transported for use or confinement in partially concentrated form.

BACKGROUND OF THE INVENTION

Many combustion processes produce flue gases contaminated with carbon dioxide that contribute to global warming and environmental damage. Such gas streams are dilute, low-pressure, and difficult to treat; therefore, this gas cannot be economically transported to places where the carbon dioxide could be used.

To make transportation more feasible, the carbon dioxide can be separated and enriched to produce 90-100% pure carbon dioxide. While this concentrated carbon dioxide can be easily transported, the separation processes required to concentrate the carbon dioxide remain expensive. As such, there remains a need for better treatment options.

Gas separation by means of membranes is a well-established technology. In an industrial setting, a total pressure difference is usually applied between the feed and permeate sides, typically by compressing the feed stream or maintaining the permeate side of the membrane under partial vacuum.

It is known in the literature that a driving force for transmembrane permeation may be supplied by passing a sweep gas across the permeate side of the membranes, thereby lowering the partial pressure of a desired permeant on that side to a level below its partial pressure on the feed side. In this case, the total pressure on both sides of the membrane may be the same, the total pressure on the permeate side may be higher than on the feed side, or there may be additional driving force provided by keeping the total feed pressure higher than the total permeate pressure.

Using a sweep gas has most commonly been proposed in connection with air separation to make nitrogen- or oxygen-enriched air, or with dehydration. Examples of patents that teach the use of a sweep gas on the permeate side to facilitate air separation include U.S. Pat. Nos. 5,240,471; 5,500,036; and 6,478,852. Examples of patents that teach the use of a sweep gas in a dehydration process include U.S. Pat. Nos. 4,931,070 and 5,641,337.

Configuring the flow path within the membrane module so that the feed gas and sweep stream flow, as far as possible, countercurrent to each other is also known, and taught, for example in U.S. Pat. Nos. 5,681,433 and 5,843,209.

The use of a process including a membrane separation step operated in sweep mode for treating flue gas to remove carbon dioxide is taught in co-owned and copending patent application Ser. No. 12/734,941, filed Jun. 2, 2010.

Despite the innovations described above, the problem of capturing and sequestering carbon dioxide, so as to prevent its release to the atmosphere, or at least to delay it for many years, remains very difficult to solve in an energy- and cost-efficient manner. Solutions that have been proposed often rely on recovering the carbon dioxide in essentially pure form, such as by subjecting a stream containing the carbon dioxide to cryogenic distillation or amine sorption, followed by liquefaction. Although these solutions are potentially useful for some applications, there remains a need for a relatively simple, low-energy solution for treating carbon dioxide streams that avoids the requirement to create a high-purity stream.

SUMMARY OF THE INVENTION

The invention is a process involving membrane-based gas separation for separating and recovering carbon dioxide emissions from combustion processes in partially concentrated form, and then transporting the carbon dioxide and using or storing it in a confined manner without concentrating it to high purity.

Combustion exhaust streams or off-gases are typically referred to as flue gas, and arise in large quantities from ovens, furnaces, boilers, and heaters in all sectors of industry. In particular, power plants generate enormous amounts of flue gas. A modestly sized 100 megawatt coal-based power plant may produce over 300 MMscfd of flue gas.

The major components of combustion exhaust gases are normally nitrogen, carbon dioxide, and water vapor. Other components that may be present, typically only in small amounts, include oxygen, hydrogen, $SO_x$, $NO_x$, and unburnt hydrocarbons. The carbon dioxide concentration in the flue gas is generally up to about 20 vol %.

In addition to gaseous components, combustion flue gas contains suspended particulate matter in the form of fly ash and soot. This material is usually removed by several stages of filtration before the gas is sent to the stack. It is assumed herein that the flue gas has already been treated in this way, if desired, prior to carrying out the processes of the invention.

The process of the invention involves treating the exhaust or flue gas to remove carbon dioxide. In preferred embodiments, the carbon dioxide level of the exhaust gas is reduced to as low as 5 vol % or less, and most preferably to 3 vol % or less, or even 2 vol % or less. Discharge of such a stream to the environment is much less damaging than discharge of the untreated exhaust.

The process of the invention further involves building up the concentration of carbon dioxide in a gas flow loop between the combustion step and the membrane separation step. A portion of the carbon dioxide-enriched gas can then be withdrawn from this loop and transported, without the need to liquefy the gas or otherwise create a high-purity stream, to a destination where it is used or confined, preferably in an environmentally benign manner. One preferred option is to direct the gas to an operation or facility that converts the carbon dioxide to oxygen by photosynthesis, such as an algae farm. A second preferred option is to use the gas for enhanced oil recovery. A third preferred option is to use the gas to enhance the recovery of coalbed methane. A fourth preferred option is to use the gas to precipitate calcium and magnesium in sea water, to immobilize the carbon dioxide and potentially produce cement and aggregate. A fifth preferred option is to inject the gas into a sub-surface aquifer or salt brine layers to sequester the carbon dioxide, thereby reducing its potential contribution to global warming.

The combustion process from which the exhaust is drawn may be of any type. The fuel may be a fossil fuel, such as coal, oil, or natural gas, or may be from any other source, such as landfill gas, syngas, biomass, or other combustible waste. The fuel may be combusted by mixing with air, oxygen-enriched air, or pure oxygen.

The combustion process produces an exhaust gas, off-gas, or flue gas, which is sent for treatment in a membrane separation unit. The unit contains membranes selectively permeable to carbon dioxide over nitrogen, and to carbon dioxide over oxygen. It is preferred that the membrane provide a carbon dioxide permeance of at least about 300 gpu, more preferably at least about 500 gpu, and most preferably at least about 1,000 gpu under the operating conditions of the process. A carbon dioxide/nitrogen selectivity of at least about 10, or more preferably 20, under the operating conditions of the process is also desirable.

The off-gas flows across the feed side of the membranes, and a sweep gas of air, oxygen-enriched air, or oxygen flows across the permeate side, to provide at least part of the driving force for transmembrane permeation. It is preferred that the feed gas flow direction across the membrane on the feed side and the sweep gas flow direction across the membrane on the permeate side are substantially counter-current to each other. In the alternative, the relative flow directions may be substantially cross-current or less preferred, cocurrent.

The process may be augmented by operating the membrane unit with higher total pressure on the feed side than on the permeate side, thereby increasing the transmembrane driving force for permeation. Slight compression of the feed stream to a pressure from between about 1.5 bar up to about 5 bar, such as 2 bar, is preferred.

The sweep stream picks up the preferentially permeating carbon dioxide. The combined sweep/permeate stream is then withdrawn from the membrane unit and is returned to the combustor to form at least part of the air, oxygen-enriched air, or oxygen feed to the combustion step.

The membrane separation step may be carried out using one or more individual membrane modules. Any modules capable of operating under permeate sweep conditions may be used. Preferably, the modules take the form of hollow-fiber modules, plate-and-frame modules, or spiral-wound modules. All three module types are known, and their configuration and operation in sweep, including counterflow sweep modes, is described in the literature.

The process may use one membrane module, but in most cases, the separation will use multiple membrane modules arranged in series and/or parallel flow arrangements, as is well-known in the art. Any number of membrane modules may be used.

The residue stream from the membrane separation step forms the treated exhaust gas, preferably containing less than about 5 vol % carbon dioxide, as mentioned above. This stream is typically, although not necessarily, discharged to the environment. The substantial reduction of the carbon dioxide content in the raw exhaust greatly reduces the environmental impact of discharging the stream.

Return of the carbon dioxide-enriched permeate stream from the membrane separation step to the combustion step forms a gas flow loop between the combustor and the membrane separation unit, with flue gas from the combustor flowing to the membrane separation step, and permeate gas from the membrane separation step flowing back to the combustion step.

The carbon dioxide concentration in the loop builds to a considerably higher level than would be the concentration in the flue gas from a conventional combustion step without the membrane separation step. Typically, the carbon dioxide concentration in the loop will be enriched several fold, such as three, four, five, or more times, compared with the carbon dioxide concentration that would be found in exhaust gas from a combustion step operated without the loop configuration. For example, a natural gas-fired, combined cycle power plant typically produces a flue gas with about 4-5 vol % carbon dioxide. Using the loop process of the invention, the carbon dioxide concentration of the flue gas may typically be built up to at least about 10, 20, 25, or 30 vol % or more. Similarly, the exhaust gas from an oil- or coal-fired power plant generally contains about 12-15 vol % carbon dioxide, and can typically be built up to at least about 20, 30, 40, 50 or more vol % carbon dioxide in the membrane unit/combustor loop.

Carbon dioxide is withdrawn from the loop as a carbon dioxide-enriched product, draw, or bleed stream. The process can be configured to tailor the concentration of this stream so that the stream can be used in gaseous form, without concentration to high purity and without liquefaction. Because the loop incorporates the combustion step, and circulates oxygen and nitrogen as well as carbon dioxide, the carbon dioxide concentration in the loop is usually below 60 vol %, and no more typically than about 50 vol %. In other words, the process of the invention produces a partially concentrated bleed stream.

The process is thus distinguished from processes that require the carbon dioxide to be further concentrated to a purity of 95 vol % or above. Such processes usually involve either liquefaction of the carbon dioxide by low-temperature distillation, or absorption of the carbon dioxide into a chemical or physical sorbent, followed by regeneration of the sorbent to yield a high-purity carbon dioxide product. The process of the invention does not require these steps, so is often much lower in energy consumption than such processes.

If the draw stream taken from the loop requires further concentration, this may be carried out using additional membrane separation steps, operated in any convenient manner.

The carbon dioxide-enriched stream withdrawn from the loop is used without liquefaction, preferably in a process that breaks down the carbon dioxide or that stores it in a confined way that reduces or eliminates its emission to the atmosphere. Representative, but non-limiting uses include algae fainting, enhanced oil recovery, enhanced coalbed and coal mine methane recovery, carbon dioxide mineralization for aqueous precipitation, and direct injection into underground aquifers, oceans, or brine lakes.

A number of processes exist (e.g., algae farms, enhanced oil or coalbed methane recovery operations) that can utilize carbon dioxide recovered from combustion flue gas. However, because such flue gas is dilute—typically containing 5 to 15 vol % carbon dioxide—it is not economically feasible to transport the gas to a location where it can effectively be put to use. The conduit diameter required would be very large, and blowers needed to push the gas through the conduit would require a huge amount of energy.

One alternative is to separate the carbon dioxide from the nitrogen and other components of the flue gas, producing 95% pure carbon dioxide, which can be pressurized and liquefied for easy transportation. Unfortunately, the cost of separation and pressurization is prohibitive for many end uses.

According to a preferred process of the invention, a gas stream is produced that contains approximately 30 to 50 vol % carbon dioxide at very low cost. This gas stream can then be used on-site or may be transported to a location where it can be put to effective use. If the gas needs to be transported, transportation of the concentrated gas is far more economical than transporting conventional, untreated flue gas. Typically, the volume of gas that must be pipelined is reduced five-fold or more.

In many cases, this gas can be used in the final process without further concentration of the carbon dioxide; for example, in most algae farms, coalbed or coal mine methane operations, processes such as the Calera process that mineralizes carbon dioxide by conversion into cement aggregate and carbonate solids by aqueous precipitation of calcium and magnesium in seawater, and some enhanced oil recovery applications. For some processes, further concentration of the gas may be required, but this is easier starting with 30 to 50 vol % concentration carbon dioxide than with dilute, untreated flue gas.

A basic embodiment of a process of the invention includes the following steps:
(a) performing a combustion step by combusting a mixture of a fuel and air, oxygen-enriched air, or oxygen, thereby creating an exhaust stream comprising carbon dioxide and nitrogen;
(b) providing a membrane having a feed side and a permeate side, and being selectively permeable to carbon dioxide over nitrogen and to carbon dioxide over oxygen;
(c) performing a membrane separation step, comprising,
  (i) passing at least a portion of the exhaust stream across the feed side,
  (ii) passing air, oxygen-enriched air, or oxygen as a sweep stream across the permeate side,
  (iii) withdrawing from the feed side a carbon dioxide-depleted vent stream, and
  (iv) withdrawing from the permeate side a permeate stream comprising oxygen and carbon dioxide;
(d) passing at least a portion of the permeate stream to step (a) as at least part of the air, oxygen-enriched air, or oxygen used in step (a), thereby forming a gas-flow loop between the combustion step and the membrane separation step;
(e) withdrawing from the gas flow loop a carbon dioxide-enriched, partially concentrated gas product stream; and
(f) using, storing, or otherwise disposing of the partially concentrated gas product stream in a confined manner.

Typically, the partially concentrated gas product stream is transported to a confining operation, where it is used, stored, or otherwise disposed of in a confined manner.

In one embodiment of the invention, the partially concentrated gas product stream is transported to an operation or facility that breaks down the carbon dioxide by photosynthesis, which is typically an algae farm. In a second embodiment of the invention, the partially concentrated gas product stream is used for enhanced oil recovery. In a third embodiment of the invention, the partially concentrated gas product stream is used for enhanced coalbed or coal mine methane recovery. In a fourth embodiment of the invention, the partially concentrated gas product stream is used in the production of carbonates. In a fifth embodiment of the invention, the partially concentrated gas product stream is injected into subsurface water.

A primary objective of the invention is to control carbon dioxide emissions to the atmosphere.

A secondary objective of the invention is to use membrane separation in an energy-efficient manner to provide a residue stream of carbon dioxide content below 5 vol % that can be vented to the atmosphere.

Yet another objective of the invention is to create a gas stream enriched in carbon dioxide content that can either be used on-site or transported—for example, by pipeline—in partially concentrated form, and to use this stream in an environmentally benign manner.

DETAILED DESCRIPTION OF THE INVENTION

Gas percentages given herein are by volume unless stated otherwise.

Pressures as given herein are in bar absolute unless stated otherwise.

The terms confining manner and confining operation refer to processes that use, store, or otherwise dispose of the carbon dioxide in a manner such as to essentially eliminate, reduce, or delay the emission of the recovered carbon dioxide to the atmosphere.

The terms exhaust gas, off-gas, flue gas, and emissions stream are used interchangeably herein.

With respect to streams containing carbon dioxide, the term high purity means containing at least about 95 vol % carbon dioxide.

With respect to streams containing carbon dioxide, the term partially concentrated means containing 60 vol % carbon dioxide or less.

The invention is a process for separating and recovering carbon dioxide from combustion processes, and routing the recovered carbon dioxide to a containment destination, such as an algae farm, or a containment process or step, such as an enhanced oil recovery process. In general, by the terms containment destination, containment use, and containment process, we mean any destination, use, or process that uses a carbon dioxide stream in partially concentrated form, that does not require or produce a high purity carbon dioxide stream in gas or liquid form, and that contains or converts the carbon dioxide in such a way as to essentially eliminate, or at least delay for many years, the emission of the recovered carbon dioxide to the atmosphere.

Figure 1:
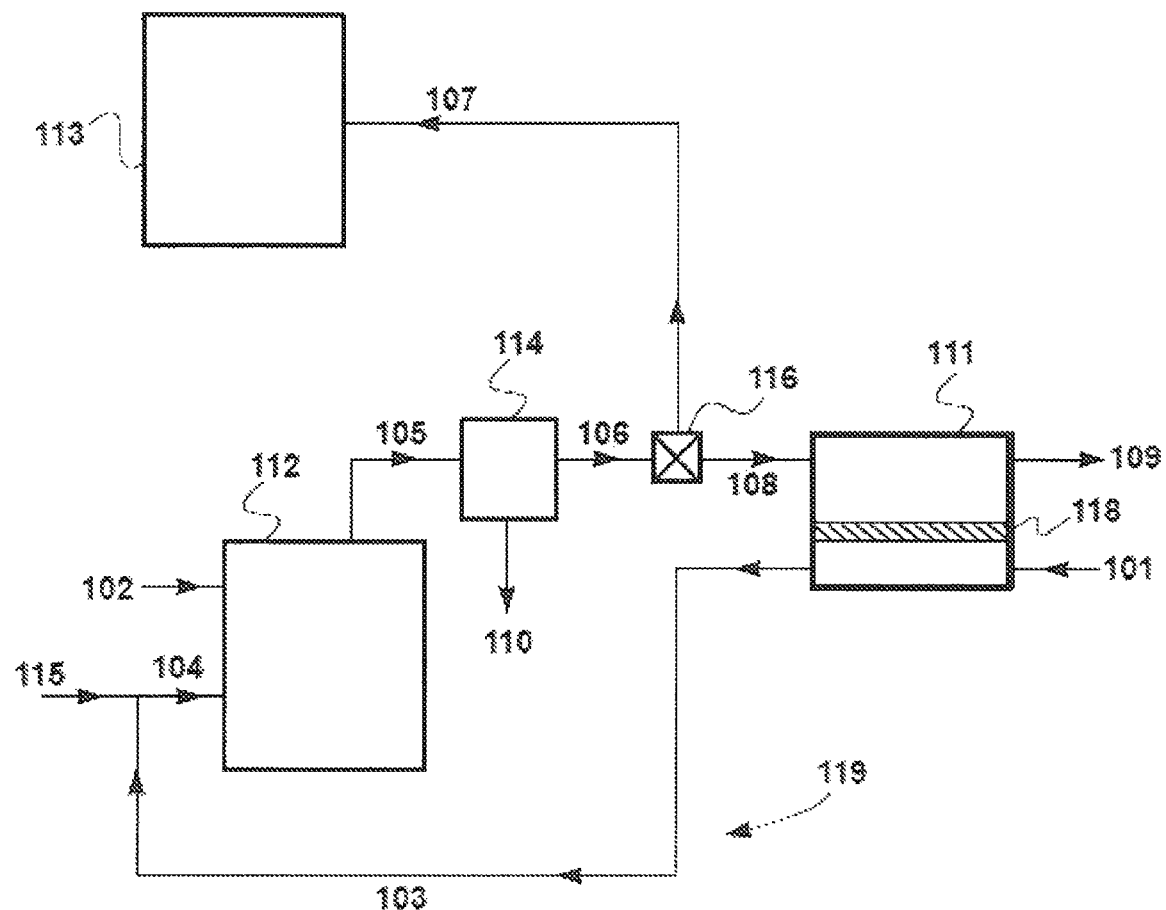
FIG. 1 is a schematic drawing of a flow scheme for a basic embodiment of the invention as it relates to a typical combustion process.

A simple flow scheme for a preferred embodiment of the invention is shown in FIG. 1. From FIG. 1, it may be seen that the process of the invention incorporates a combustion step, followed by a sweep-based membrane separation step. A portion of the exhaust stream from the combustion process is routed to the sweep-based membrane separation step, and the permeate portion of gas from the membrane separation step is routed back to the combustion step, thereby forming a gas flow loop, indicated by number 119 in the figure. A bleed, draw, or product stream is withdrawn from the gas flow loop and routed to a process that breaks down or stores the carbon dioxide in a confined manner, such as an algae farm or enhanced oil recovery process.

Referring to FIG. 1, fuel stream 102 and air, oxygen-enriched air, or oxygen stream 104 are introduced into combustion step or zone 112. Stream 104 is made up of sweep stream 103 (discussed below) and, optionally, additional air or oxygen supply stream 115.

The combustion step may be carried out in any way limited only in that it results in an off-gas, exhaust gas, or flue, gas containing carbon dioxide. Such combustion processes occur throughout industrialized society. Representative processes include those in which the combustion step is used to provide heat for an oven or furnace, such as a blast furnace or rotary kiln, for example, a lime or cement kiln. Other important processes are those in which the combustion step is used to generate steam to operate a turbine or other equipment to perform mechanical work or generate electric power. In yet other processes, the combustion gases themselves are used as a source of power to drive a turbine or the like, and may be treated before or after they have been used in the turbine. Further examples of combustion processes are those used to supply heat for refinery operations, such as certain types of cracking or reforming.

The fuel for the combustion step may be any fuel that can be combusted with oxygen, including, but not limited to, coal, coke, wood, biomass, solid wastes, oils, and other natural and synthetic liquid fuels of all grades and types, and hydrocarbon-containing gas of any type, such as natural gas, landfill gas, coal mine gas, or the like.

The oxygen with which the fuel is combusted may be supplied in the form of high purity oxygen, oxygen-enriched air, normal air, or any other suitable oxygen-containing mixture.

Combustion exhaust stream 105—preferably containing at least 15 vol %; more preferably, at least 20 vol %; and, most preferably, at least 25 vol %, carbon dioxide—is withdrawn. This stream usually contains at least carbon dioxide, water vapor, nitrogen, and oxygen, as well as the other components mentioned in the Summary section above. Combustion exhaust stream 105 is optionally but typically routed through a condenser 114, where water 110 is knocked out of the stream. The dehydrated exhaust stream 106 is then typically routed through valve or splitter 116, and passes as feed stream 108 to a sweep-based membrane separation step, 111.

The membrane separation unit 111 contains membranes 118 that exhibit high permeance for carbon dioxide, as well as high selectivity for carbon dioxide over nitrogen. Any membrane with suitable performance properties may be used. Many polymeric materials, especially elastomeric materials, are very permeable to carbon dioxide. Preferred membranes for separating carbon dioxide from nitrogen or other inert gases have a selective layer based on a polyether. A number of such membranes are known to have high carbon dioxide/nitrogen selectivity, such as 30, 40, 50, or above. A representative preferred material for the selective layer is Pebax®, a polyamide-polyether block copolymer material described in detail in U.S. Pat. No. 4,963,165. We have found that membranes using Pebax® as the selective polymer can maintain a selectivity of 10 or greater under process conditions.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties.

The membranes may be manufactured as flat sheets or as fibers and housed in any convenient module form, including spiral-wound modules, plate-and-frame modules, and potted hollow fiber modules. The making of all these types of membranes and modules is well known in the art. To provide countercurrent flow of the sweep gas stream, the modules preferably take the form of hollow fiber modules, plate-and-frame modules, or spiral-wound modules.

Flat-sheet membranes in spiral-wound modules is the most preferred choice for the membrane/module configuration. A number of designs that enable spiral-wound modules to be used in counterflow mode with or without sweep on the permeate side have been devised. A representative example is described in U.S. Pat. No. 5,034,126, to Dow Chemical.

Membrane step or unit 111 may contain a single membrane module or bank of membrane modules or an array of modules. A single unit or stage containing one or a bank of membrane modules is adequate for many applications. If the residue stream requires further purification, may be passed to a second bank of membrane modules for a second processing step. If the permeate stream requires further concentration, it may be passed to a second bank of membrane modules for a second-stage treatment. Such multi-stage or multi-step processes, and variants thereof, will be familiar to those of skill in the art, who will appreciate that the membrane separation step may be configured in many possible ways, including single-stage, multi-stage, multi-step, or more complicated arrays of two or more units in serial or cascade arrangements.

Although the membrane modules are typically arranged horizontally, a vertical configuration may in some cases be preferred to reduce the risk of deposition of particulates on the membrane feed surface.

The separation of components achieved by the membrane unit depends not only on the selectivity of the membrane for the components to be separated, but also on the pressure ratio. By pressure ratio, we mean the ratio of total feed pressure/total permeate pressure. In pressure driven processes, it can be shown mathematically that the enrichment of a component (that is, the ratio of component permeate partial pressure/component feed partial pressure) can never be greater than the pressure ratio. This relationship is true, irrespective of how high the selectivity of the membrane may be.

Further, the mathematical relationship between pressure ratio and selectivity predicts that whichever property is numerically smaller will dominate the separation. Thus, if the numerical value of the pressure ratio is much higher than the selectivity, then the separation achievable in the process will not be limited by the pressure ratio, but will depend on the selectivity capability of the membranes. Conversely, if the membrane selectivity is numerically very much higher than the pressure ratio, the pressure ratio will limit the separation. In this case, the permeate concentration becomes essentially independent of the membrane selectivity and is determined by the pressure ratio alone.

High pressure ratios can be achieved by compressing the feed gas to a high pressure or by using vacuum pumps to create a lowered pressure on the permeate side, or a combination of both. However, the higher the selectivity, the more costly in capital and energy it becomes to achieve a pressure ratio numerically comparable with or greater than the selectivity.

From the above, it can be seen that pressure-driven processes using membranes of high selectivity for the components to be separated are likely to be pressure ratio-limited. For example, a process in which a membrane selectivity of 40, 50, or above is possible (such as is the case for many carbon dioxide/nitrogen separations) will only be able to take advantage of the high selectivity if the pressure ratio is of comparable or greater magnitude.

The inventors have overcome this problem and made it possible to utilize more of the intrinsic selective capability of the membrane by diluting the permeate with the sweep gas, stream 101, thereby preventing the permeate side concentration building up to a limiting level.

This mode of operation can be used with a pressure ratio of 1, that is, with no total pressure difference between the feed and permeate sides, with a pressure ratio less than 1, that is, with a higher total pressure on the permeate side than on the feed side, or with a relatively modest pressure ratio of less than 10 or less than 5, for example.

The driving force for transmembrane permeation is supplied by lowering the partial pressure of the desired permeant on the permeate side to a level below its partial pressure on the feed side. The use of the sweep gas stream 101 maintains a low carbon dioxide partial pressure on the permeate side, thereby providing driving force.

The partial pressure on the permeate side may be controlled by adjusting the flow rate of the sweep stream to a desired value. In principle, the ratio of sweep gas flow to feed gas flow may be any value that provides the desired results, although the ratio of sweep gas flow:feed gas flow will seldom be less than 0.1 or greater than 10. High ratios (that is, high sweep flow rates) achieve maximum carbon dioxide removal from the feed, but a comparatively carbon dioxide dilute permeate stream (that is, comparatively low carbon dioxide enrichment in the sweep gas exiting the modules). Low ratios (that is, low sweep flow rates) achieve high concentrations of carbon dioxide in the permeate, but relatively low levels of carbon dioxide removal from the feed.

Use of a too low sweep flow rate may provide insufficient driving force for a good separation, and use of an overly high sweep flow rate may lead to pressure drop or other problems on the permeate side, or may adversely affect the stoichiometry in the reaction vessel, while achieving only an incremental improvement in separation. Typically and preferably, the flow rate of the sweep stream should be between about 50% and 200% of the flow rate of the membrane feed stream, and most preferably between about 80% and 120%. Often a ratio of about 1:1 is convenient and appropriate.

The total gas pressures on each side of the membrane may be the same or different, and each may be above or below atmospheric pressure. As mentioned above, if the pressures are about the same, the entire driving force for permeation is provided by the sweep mode operation.

In most cases, however, flue gas is available at atmospheric pressure, and the volumes of the streams involved are so large that it is not preferred to use either significant compression on the feed side or vacuum on the permeate side. However, slight compression, such as from atmospheric to 2 or 3 bar, can be helpful and can provide part of a total carbon dioxide capture and recovery process that is relatively energy efficient, as shown in the examples below.

Returning again to FIG. 1, flue gas stream 108 flows as a feed stream across the feed side of the membranes, while a sweep gas of air, oxygen-enriched air, or oxygen stream 101, flows across the permeate side. The sweep stream picks up the preferentially permeating carbon dioxide, and the resulting permeate stream 103 is withdrawn from the membrane unit and is combined with stream 115 to form the air or oxygen feed 104 to the combustor. In the alternative, stream 115 may be omitted and the entirety of the oxygen-containing feed to the combustor may be provided by the permeate stream 103.

By using the oxygen-containing stream destined for the combustor as sweep gas, the membrane separation step is carried out in a very efficient manner, and without introducing any additional unwanted components into the combustion zone. The process is particularly useful in applications that are energy-sensitive, as is almost always the case when the very large streams from power plants and the like are to be processed. The process is also particularly useful in separations that are pressure-ratio limited.

The residue stream 109 resulting from the membrane sweep step 111 is reduced in carbon dioxide content to less than about 5 vol %, more preferably, to less than 3 vol %; and, most preferably, to less than 2 vol %. The residue stream 109 is typically discharged to the environment as treated flue gas, but may alternatively be sent on for further treatment—membrane or otherwise.

As discussed above, the permeate/sweep stream, 103, returns carbon dioxide to the combustor, thereby forming a loop, 119, between the combustor and the membrane unit in which the carbon dioxide concentration can build up.

The carbon dioxide concentration in the loop 119 builds to a considerably higher level than would be the concentration in the flue gas from a conventional combustion step without the membrane separation step. Typically, the carbon dioxide concentration in the loop will be enriched several fold, such as three, four, five, or more times, compared with the carbon dioxide concentration that would be found in exhaust gas from a combustion step operated without the loop configuration. For example, a natural gas-fired, combined cycle power plant typically produces a flue gas with about 4-5 vol % carbon dioxide. Using the loop process of the invention, the carbon dioxide concentration of the flue gas may typically be built up to at least about 10, 20, 25, or 30 vol %, or more. Similarly, the exhaust gas from an oil- or coal-fired power plant generally contains about 12-15 vol % carbon dioxide, and can typically be built up to at least about 20, 30, 40, 50 or more vol % carbon dioxide in the membrane unit/combustor loop.

In addition to recirculating carbon dioxide, the loop also passes oxygen and nitrogen to the combustion step. Most membrane materials have slight selectivity for oxygen over nitrogen, so a little oxygen from the air sweep stream will tend to counter-permeate to the feed side of the membranes and be lost in the membrane residue stream. In consequence, the concentration of oxygen in the combustor may drop, giving rise to the possibility of incomplete combustion or other problems. As an indication that the combustion step is being provided with an adequate supply of oxygen, we prefer the process to be operated so as to provide an oxygen concentration of at least about 3 vol % in the exhaust gas stream 106 (based on the composition after water removal).

In some combustion processes, a certain volume of excess air or nitrogen is required to flow unburnt through the combustor to control the combustion temperature. For example, in combined cycle power plants using natural gas as fuel, the ratio of air to fuel in the combustion step may be about twice the stoichiometric ratio needed for combustion of methane, the surplus air being used to cool the gas sufficiently so as not to damage turbine blades or other plant equipment.

Further, we have discovered that trade-offs exist between the degree of carbon dioxide enrichment that can be obtained by the membrane separation steps, the amount of oxygen lost into the residue stream, and the membrane area and compression requirements to operate the membrane separation step. In light of all the above considerations, we prefer to operate the process to keep the carbon dioxide concentration in the exhaust gas side of the loop at no more than about 60 vol %, and no more typically than about 50 vol %.

Carbon dioxide is withdrawn from the loop through valve or splitter, 116, as partially concentrated, carbon dioxide-enriched product, draw, or bleed stream, 107. Typically, the stream will be withdrawn continuously, although allowing the carbon dioxide to build up and withdrawing stream 107 intermittently is within the scope of the invention.

The flow of gas withdrawn from the loop as stream 107 is usually, but not necessarily, less than half of the flow of gas in stream 106. The effect of varying the comparative ratios of gas withdrawn as stream 107 and gas passed on to the membrane unit as stream 108 is illustrated in the examples. For most applications, it is preferred that between about 10 vol % and 50 vol % of the gas flowing in stream 106 be withdrawn as stream 107.

Stream 107 is sent to any containment destination, process, or use—indicated as box 113 in FIG. 1—that breaks down the carbon dioxide or that stores it in a confined way that reduces, eliminates, or delays for a prolonged period of time its emission to the atmosphere. Representative, but non-limiting, uses include algaculture and enhanced oil recovery (EOR).

A particular example of a containment destination in which the carbon dioxide is broken down or consumed is one in which photosynthesis can occur, thereby converting the carbon dioxide to sugars or other organic compounds and oxygen. Specific examples of such a destination are specialized greenhouses and facilities used for algaculture. Algaculture—also known as "algae farming"—is a form of aquaculture involving the farming of various species of algae. Commercial and industrial algae cultivation has numerous uses, including production of food ingredients, food, fertilizer, bioplastics, dyes and colorants, chemical feedstock, pharmaceuticals, and algal fuel. Water, carbon dioxide, minerals, and light are all important factors in algal cultivation, and different algae have different requirements. The basic reaction in water, however, is carbon dioxide+light energy=glucose+oxygen. In subsequent reactions, algae can convert the glucose to lipids (in the the production of biodiesel) or ethanol (in the production of bioethanol). By converting carbon dioxide to glucose and oxygen, algaculture can serve as an effective means of pollution control.

In this case, the carbon dioxide enriched stream may simply be directed into the enclosed environment where the plants or algae that will utilize it are located. For such applications, a carbon dioxide concentration in stream 107 up to about 30 vol % is preferred. If the stream is still too dilute when it is withdrawn from the loop, it may be subjected to some additional concentration in a separate membrane separation step. The stream is preferably fed to the algae farm, ponds, greenhouses, or the like at about atmospheric pressure, so that nothing more than a blower is required to pass the stream from the gas flow loop to the containment destination. Less preferably, the stream may be compressed, if it needs to be transported by pipeline or trucked to the destination, for example. By concentrating the carbon dioxide, the efficiency of the algae conversion process is enhanced, and the cost of transporting the carbon dioxide from the power plant to the algae farm is reduced two- or three-fold.

A particular example of a containment use in which the carbon dioxide is not converted, but is sequestered for a prolonged period is enhanced oil recovery (EOR). Enhanced oil recovery is a generic term for techniques for increasing the amount of crude oil that can be extracted from an oil field. Using enhanced oil recovery, 30-60% or more of the reservoir's original oil can be extracted, compared with 20-40% if enhanced oil recovery is not used. Enhanced oil recovery is typically achieved by gas injection, chemical injection, microbial injection, or thermal recovery. Gas re-injection is presently the most commonly used approach to enhanced oil recovery. In addition to the beneficial effect of the pressure, this method sometimes aids recovery by reducing the viscosity of the crude oil as the gas mixes with it. Gases used include carbon dioxide, natural gas, or nitrogen.

Oil displacement by carbon dioxide injection relies on the phase behavior of the mixtures of carbon dioxide and crude oil, which are strongly dependent on reservoir temperature, pressure, and crude oil composition. These mechanisms range from oil swelling and viscosity reduction for injection of immiscible fluids (at low pressures) to completely miscible displacement in high-pressure applications. In these applications, more than half and up to two-thirds of the injected carbon dioxide returns with the produced oil and is usually re-injected into the reservoir to minimize operating costs; the remainder is trapped in the oil reservoir by various means.

In EOR, the gas injected into the field serves both to help repressurize the field, and as a solvent to reduce hydrocarbon viscosity and render the oil more mobile. In general, any inert gas will suffice for repressurization, whereas most or all of the solvent capability of the gas is provided by carbon dioxide. For this application, therefore, it is most preferred if the carbon dioxide concentration in stream 107 is at least about 30 vol % and, if possible, to 50 vol % or more. To be useful for EOR, gas stream 107 will normally require compression before it can be used.

Another potential application of the process is carbon dioxide sequestration and enhanced coalbed methane recovery (ECMR). Sequestration of carbon dioxide in unmineable coalbeds is a potential way to reduce greenhouse gas emissions, while increasing coalbed methane production. Carbon dioxide, together with nitrogen, is compressed and injected into coalbeds. The carbon dioxide—and to a lesser extent, the nitrogen—displaces adsorbed methane held on internal surfaces of coal particles. Laboratory and field trials have shown that, for every two volumes of carbon dioxide adsorbed onto the surface of the coal, approximately one volume of methane is displaced and can be recovered. The displaced methane (with impurities such as carbon dioxide, nitrogen, oxygen, and water) can be collected and processed to form pipeline natural gas and sent back to the power plant. Optionally, untreated gas or minimally treated gas still containing carbon dioxide can be used as fuel by the power plant. The process has been practiced in the San Juan Basin since 1993, using pipeline carbon dioxide, pure nitrogen, or raw flue gas containing carbon dioxide and nitrogen. Methane production increases by as much as ten times with the injection of carbon dioxide and/or nitrogen. Similar processes can be used to recover methane from coal mines that are no longer in production.

One of the main cost elements in such processes is the cost of transporting raw flue gas to coalbed methane injection sites. By concentrating the carbon dioxide in the flue gas to 30 to 50 vol %, for example, a substantial reduction in transportation cost is achieved.

Long-term storage of power plant flue gas in coalbeds is one of the most attractive carbon dioxide sequestration options. The enhanced production of natural gas produced when the carbon dioxide is injected provides a revenue source that contributes significantly to covering the cost of carbon dioxide separation and transportation to the injection wells.

Yet another category of application is where the carbon dioxide is a raw material for some form of chemical process, for example, the production of cement and aggregate by aqueous precipitation of calcium and magnesium. In this process, flue gas containing carbon dioxide is scrubbed with alkaline sea water in a large scrubber. Calcium, magnesium, and other metals in the sea water react with the carbon dioxide and are removed as carbonated precipitates. This absorption/contact is a major cost in the process, and the size of this cost is a function of the carbon dioxide concentration in the flue gas sent to the absorber. Increasing the concentration of carbon dioxide in the flue gas reduces the transportation costs for carbon dioxide to the reactor site and improves the efficiency of the reaction process. This technology is being developed by Calera of Moss Landing, Calif., for example.

Other uses will be apparent to those of skill in the art based on the teachings herein.

Figure 2:
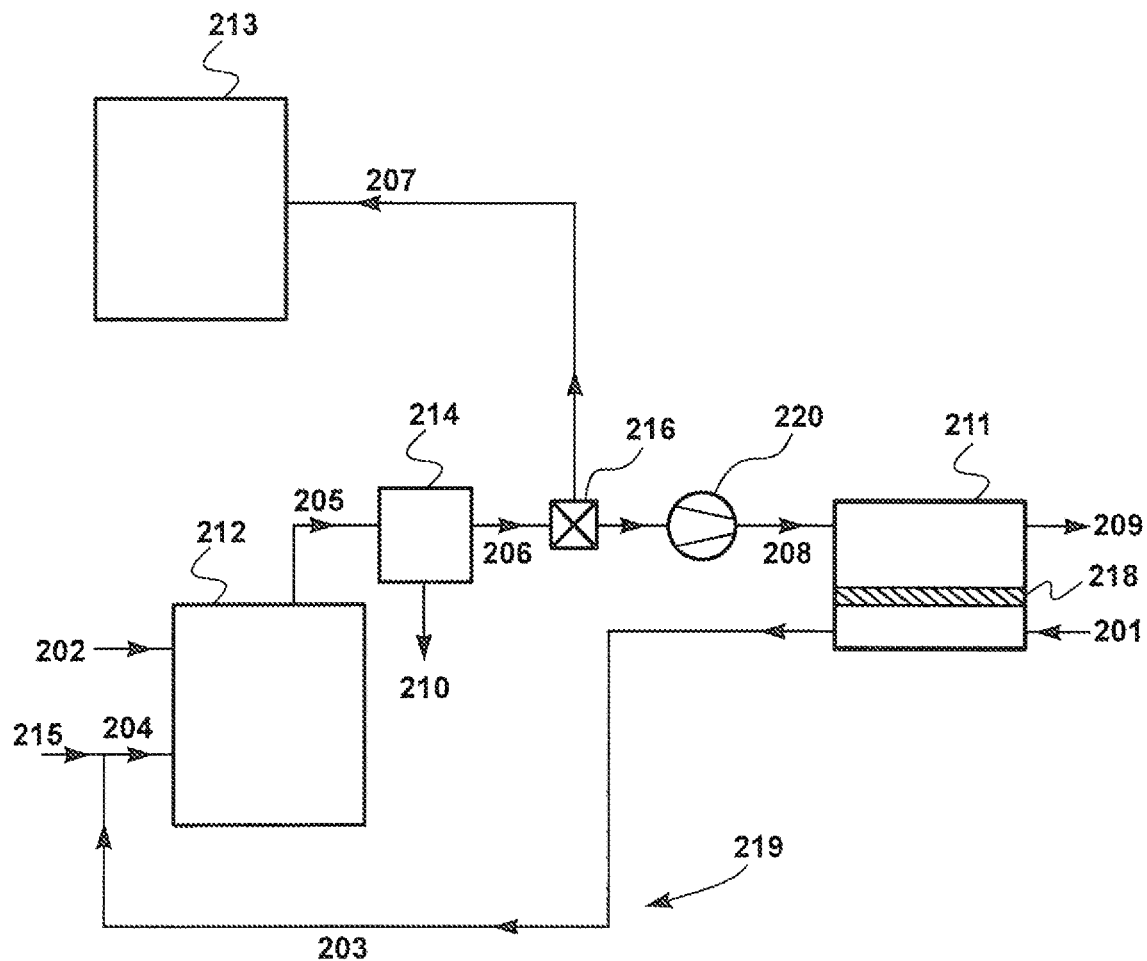
FIG. 2 is a schematic drawing of a flow scheme for an embodiment of the invention, which is a variant of the flow scheme shown in FIG. 1, in which the exhaust stream being routed to the sweep-based membrane separation step is passed through a compressor prior to being sent to the membrane separation step.

FIG. 2 is a schematic drawing of a flow scheme for an embodiment of the invention, which is a variant of the flow scheme shown in FIG. 1, in which the portion of the exhaust stream being routed to the sweep-based membrane separation step is passed through a compressor prior to being sent to the membrane separation step. Such embodiments are preferred in situations where the energy costs of the compression step can be tolerated, such as when energy can be recovered in a turbo-expander, as discussed with respect to the series embodiments of the invention above.

From FIG. 2, it may be seen that the process of the invention incorporates a combustion step, followed by a compression step and a sweep-based membrane separation step. A portion of the exhaust stream from the combustion process is routed to the sweep-based membrane separation step, and the permeate portion of gas from the membrane separation step is routed back to the combustion step, thereby forming a gas-flow loop, indicated by number 219 in the figure. A bleed, draw, or product stream is withdrawn from the gas flow loop and routed to a process that breaks down or stores the carbon dioxide in a confined manner, such as an algae farm or enhanced oil recovery process.

To initiate the combustion process, fuel stream 202 and air, oxygen-enriched air, or oxygen stream 204 are introduced into combustion step or zone 212. Stream 204 is made up of sweep stream 203 and optionally, additional air or oxygen supply stream 215.

Combustion exhaust stream 205—preferably containing at least 15 vol %; more preferably, at least 20 vol %; and, most preferably, at least 25 vol %, carbon dioxide—is withdrawn. Combustion exhaust stream 205 is typically routed through a condenser 214, where water 210 is knocked out of the stream. The dehydrated exhaust stream 206 is then typically routed through a valve or splitter 216, and passes as feed stream 208 to a sweep-based membrane separation step, 211.

In this particular embodiment, the portion 208 of combustion exhaust stream 206 that is to be routed to the sweep-based membrane separation step 211 is routed through a compressor 220, where it is compressed to a pressure of up to about 5 bar, such as 2 bar, prior to being sent for treatment in membrane separation step or unit 211. The membrane separation unit 211 contains membranes 218 that exhibit high permeance for carbon dioxide, as well as high selectivity for carbon dioxide over nitrogen, as discussed above with respect to the invention embodiment shown in FIG. 1.

Portion 208 of combustion exhaust stream 206 flows across the feed side of the membranes; a sweep gas of air, oxygen-enriched air, or oxygen stream 201, flows across the permeate side. The sweep stream picks up the preferentially permeating carbon dioxide, and the resulting permeate stream 203 is withdrawn from the membrane unit and is combined with stream 215 to form the air or oxygen feed 204 to the combustor. In the alternative, stream 215 may be omitted and the entirety of the oxygen-containing feed to the combustor may be provided by the permeate stream 203.

The residue stream 209 resulting from the membrane sweep step 211 is reduced in carbon dioxide content to less than about 5 vol %, more preferably, to less than 3 vol %; and, most preferably, to less than 2 vol %. The residue stream 209 is typically discharged to the environment as treated flue gas, but may alternatively be sent on for further treatment—membrane or otherwise.

As discussed above, the permeate/sweep stream, 203, returns carbon dioxide to the combustor, thereby forming a loop, 219, between the combustor and the membrane unit in which the carbon dioxide concentration can build up.

The carbon dioxide concentration in the loop 219 builds to a considerably higher level than would be the concentration in the flue gas from a conventional combustion step without the membrane separation step. Typically, the carbon dioxide concentration in the loop will be enriched several fold, such as three, four, five, or more times, compared with the carbon dioxide concentration that would be found in exhaust gas from a combustion step operated without the loop configuration. For example, a natural gas-fired, combined cycle power plant typically produces a flue gas with about 4-5 vol % carbon dioxide. Using the loop process of the invention, the carbon dioxide concentration of the flue gas may typically be built up to 10, 20, 25, or 30 vol %. Similarly, the exhaust gas from an oil- or coal-fired power plant generally contains about 12-15 vol % carbon dioxide, and can be built up to 20, 30, 40, or more vol % carbon dioxide in the membrane unit/combustor loop.

Carbon dioxide is withdrawn from the loop through valve or splitter, 216, as partially concentrated, carbon dioxide-enriched product, draw, or bleed stream, 207. Typically, the stream will be withdrawn continuously, although, as discussed above, allowing the carbon dioxide to build up and withdrawing stream 207 intermittently is within the scope of the invention.

The flow of gas withdrawn from the loop as stream 207 is usually, but not necessarily, less than half of the flow of gas in stream 206. The effect of varying the comparative ratios of gas withdrawn as stream 207 and gas passed on to the membrane unit as stream 208 is illustrated in the examples. For most applications, it is preferred that between about 10 vol % and 50 vol % of the gas flowing in stream 206 be withdrawn as stream 207.

Stream 207 is sent to any containment destination, process, or use—indicated as box 213 in FIG. 2—that breaks down the carbon dioxide or that stores it in a confined way that reduces, eliminates, or delays for a prolonged period of time its emission to the atmosphere, as discussed above.

The invention is now further described by the following examples, which are intended to be illustrative of the invention, but are not intended to limit the scope or underlying principles in any way.

EXAMPLES

Example 1

Bases of Calculations for Other Examples (a) Membrane Permeation Experiments:

The following calculations were performed using a composite membrane having a polyether-based selective layer with the properties shown in Table 1.

TABLE 1

| Gas | Permeance (gpu)* | $CO_2$/Gas Selectivity |
|---|---|---|
| Carbon dioxide | 1,000 | — |
| Nitrogen | 30 | 33 |
| Oxygen | 60 | 17 |
| Hydrogen | 100 | 10 |
| Carbon | 1 | 1,000 |
| Water | 5,000** | — |

*Gas permeation unit; 1 gpu = 1 × 10$^{-6}$ cm$^3$(STP)/cm$^2$ · s · cmHg
**Estimated, not measured (b) Calculation Methodology:

All calculations were performed using a modeling program, ChemCad 5.6 (ChemStations, Inc., Houston, Tex.), containing code for the membrane operation developed by MTR's engineering group. For the calculations, all compressors and vacuum pumps were assumed to be 75% efficient. In each case, the modeling calculation was performed to achieve 90% recovery of carbon dioxide from the flue gas stream.

(c) "No Membrane" Example:

A computer calculation was performed to determine the chemical composition of untreated flue gas from a coal combustion process. The calculation was performed assuming that the flue gas to be treated was from a 500 MW gross power coal-fired power plant. It was assumed that the exhaust gas is filtered to remove fly ash and other particulate matter before passing to the membrane separation steps.

Figure 3:
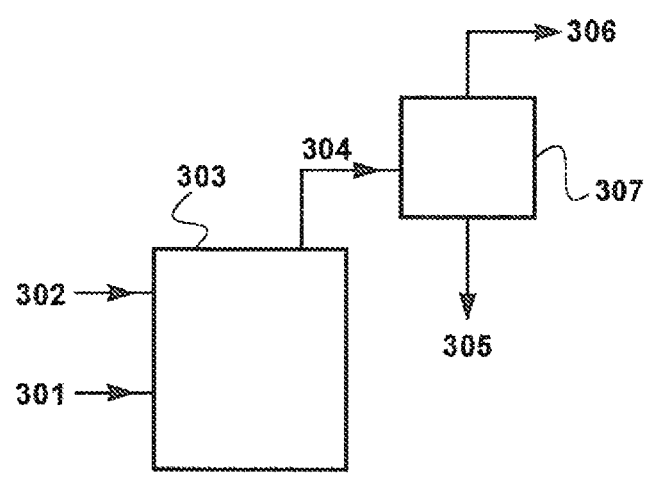
FIG. 3 is a schematic drawing of a flow scheme for a combustion process that does not include a sweep-based membrane separation step (not in accordance with the invention).

FIG. 3 is a schematic drawing of a flow scheme for a combustion process that does not include a sweep-based membrane separation step. Fuel stream 302 and air stream 301 are introduced into combustion step or zone 303. (The combustion step, the fuel for the combustion step, and the oxygen with which the fuel is combined are as described in the Detailed Description, above.)

Combustion exhaust stream 304 is withdrawn, then routed through a cooler/condenser 307, where water 305 is knocked out of the stream. The chemical composition of the resulting untreated flue gas stream 306 was then calculated. The results of this calculation are shown in Table 2.

TABLE 2

| | Stream | | | |
|---|---|---|---|---|
| Parameter | Coal (302) | Air Stream (301) | Condenser Knockout (305) | Flue Gas (306) |
| Total Flow (kg/h) | 132,000 | 2,280,000 | 62,160 | 2,349,600 |
| Temperature (° C.) | 25.0 | 25.0 | 40.0 | 40.0 |
| Pressure (bar) | 1.0 | 1.0 | 1.0 | 1.0 |
| Component (vol %) | | | | |
| Coal (carbon + hydrogen) | 100.0 | 0 | 0 | 0 |
| Oxygen | 0 | 21.0 | 0 | 3.1 |
| Nitrogen | 0 | 79.0 | 0 | 77.8 |
| Carbon Dioxide | 0 | 0 | 0 | 11.7 |
| Water | 0 | 0 | 100 | 7.4 |

After the water vapor in the stream is condensed, the carbon dioxide concentration in the combustion exhaust stream is 11.7 vol %. Discharge of such a stream in its untreated form would release 10,000 tons of carbon dioxide into the atmosphere per day. On the other hand, the flow volume of the stream (1,800,000 m$^3$/h) is so large as to render transportation of the stream for treatment or use very difficult.

Examples 2-8

Processes of the Invention: Modeling of Sweep-Based Membrane Separation Step and Effect on Combustion Step A set of calculations was performed to model the effect of various process parameters on the performance of the sweep-based membrane separation step and its effect on the combustion step. The calculations for Examples 2 through 8 were performed using the flow scheme shown in FIG. 1 and described in the Detailed Description, above. This flow scheme includes a sweep-based membrane separation step, 111.

To facilitate operation of the calculation software, the base case air flow provided to the combustor via the membrane permeate side was assumed to be about 740 m$^3$/h (950 kg/h), compared with the typical air flow to a 500 MW power plant of about 1.8 million m$^3$/h used for the calculation of Example 1. In other words, the scale of the calculations for Examples 2 through 8 was about ½,400 of the scale for a typical coal-fired power plant. This reduces membrane area proportionately, but does not affect the relative flow rates or compositions of the streams involved.

Example 2

Process of the Invention

In this example, the membrane area was assumed to be 400 m$^2$, and the combustion exhaust stream split ratio was set at 1:1 (bleed flow of partially concentrate product gas:flow to sweep-based membrane separation step). The separation was assumed to be performed using a membrane having permeation properties as in Table 1. The results of this calculation are shown in Table 3.

TABLE 3

| Parameter | Coal (102) | Condenser Knockout (110) | Partially Concentrated Product Gas (107) | Membrane Feed (108) | Air Sweep (101) | Gas to Combustor (103) | Retentate (109) |
|---|---|---|---|---|---|---|---|
| Total Flow (kg/h) | 55 | 46 | 554 | 554 | 950 | 1100 | 404 |
| Temperature (° C.) | 25 | 40 | 40 | 40 | 25 | 33 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 17.5 | 5.2 |
| Nitrogen | 0 | 0 | 71.8 | 71.8 | 79.0 | 70.6 | 91.9 |
| Carbon Dioxide | 0 | 0 | 19.2 | 19.2 | 0 | 8.3 | 2.9 |
| Water | 0 | 100 | 7.4 | 7.4 | 0 | 3.6 | 0 |

Compared with the "no membrane" Example 1, the carbon dioxide content in the combustion exhaust stream (membrane feed), 108, and the partially concentrated product gas, 107, is increased from 11.7 vol % to 19.2 vol %. The carbon dioxide concentration in the membrane residue stream is reduced to 2.9 vol %, and venting of this stream to the atmosphere would release about 1,000 tons of carbon dioxide per day from a 500 MW power plant. Comparing this Example with Example 1, it can be seen that the process is effective in capturing 90% of the carbon dioxide emitted from the combustion section of the power plant.

As can also be seen, however, use of the incoming air as the permeate sweep stream reduces the oxygen content in the air to the combustor from the normal 21 vol % to 17.5 vol %. As a result, the oxygen content of the combustion exhaust stream, 108, is reduced to 1.6 vol %. The low exhaust oxygen concentration indicates that the combustion process may be compromised under these conditions.

Example 3

Process of the Invention with Increased Air Flow

In this set of calculations, the air flow to the process via the permeate sweep stream was increased incrementally, until the calculation showed an oxygen content of 3 vol % in the combustor exhaust stream. This required the intake flow rate of air to be increased from 950 kWh to 1,035 kg/h. All other operating parameters, including split ratio and membrane area, were the same as in Example 2. The results of the calculation are shown in Table 4.

TABLE 4

| Parameter | Coal (102) | Condenser Knockout (110) | Partially Concentrated Product Gas (107) | Membrane Feed (108) | Air Sweep (101) | Gas to Combustor (103) | Retentate (109) |
|---|---|---|---|---|---|---|---|
| Total Flow (kg/h) | 55 | 44 | 596 | 596 | 1035 | 1182 | 450 |
| Temperature (° C.) | 25 | 40 | 40 | 40 | 25 | 33 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 3.2 | 3.2 | 21.0 | 17.8 | 6.6 |
| Nitrogen | 0 | 0 | 72.0 | 72.0 | 79.0 | 71.1 | 90.3 |
| Carbon Dioxide | 0 | 0 | 17.4 | 17.4 | 0 | 7.4 | 3.1 |
| Water | 0 | 100 | 7.4 | 7.4 | 0 | 3.7 | 0 |

Although the oxygen content of the combustion exhaust stream 108 is increased to 3.2 vol %, the carbon dioxide content of the combustion exhaust stream, 108, and, hence, the partially concentrated product gas, 107, was lower than in Example 2, at 17.4 vol % and the carbon dioxide content of the treated flue gas, 109, was a little higher, at 3.1 vol %.

Example 4

Process of the Invention with Split Ratio 1:2

In this set of calculations, the split ratio was changed to 1:2, that is, two volumes of exhaust gas were assumed to be sent to the membrane separation step for every volume of exhaust gas withdrawn from the loop as partially concentrated product gas. The membrane area as again assumed to be 400 m², and the air flow rate in stream 101 was assumed to be the base calculation value of 950 kg/h. The results of the calculation are shown in Table 5.

TABLE 5

| | Stream | | | | | | |
|---|---|---|---|---|---|---|---|
| Parameter | Coal (102) | Condenser Knockout (110) | Partially Concentrated Product Gas (107) | Membrane Feed (108) | Air Sweep (101) | Gas to Combustor (103) | Retentate (109) |
| Total Flow (kg/h) | 55 | 54 | 384 | 768 | 950 | 1151 | 567 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100.0 | 0 | 0 | 0 | 0 | 0 | 0 |
| Oxygen | 0 | 0 | 1.6 | 1.6 | 21.0 | 16.8 | 4.3 |
| Nitrogen | 0 | 0 | 69.7 | 69.7 | 79.0 | 67.8 | 89.2 |
| Carbon Dioxide | 0 | 0 | 21.3 | 21.3 | 0 | 10.6 | 6.4 |
| Water | 0 | 100 | 7.4 | 7.4 | 0 | 4.8 | 0.1 |

Increasing the relative volume of exhaust gas being treated in the membrane separation step results in a substantial increase in the concentration of carbon dioxide in the partially concentrated product gas. The exhaust gas has almost double the concentration of carbon dioxide compared with Example 1. However, the oxygen content of the combustion exhaust stream, 108, has dropped to an undesirably, low value (1.6 vol %) and the carbon dioxide content of the treated flue gas is relatively high (6.5 vol %).

Example 5

Process of the Invention with Increased Membrane Area

To compensate for the adverse aspects of decreasing the split ratio as in Example 4, the membrane area was assumed to be doubled, to 800 m². As in Example 3, a set of calculations was performed, increasing the air intake incrementally to the process to bring the oxygen concentration of the flue gas stream from the combustor back to 3 vol %. This required the intake flow rate of air to be increased from 950 kg/h to 1,090 kg/h. All other operating parameters, including split ratio, were the same as in Example 4. The results of the calculation are shown in Table 6.

TABLE 6

| | Stream | | | | | | |
|---|---|---|---|---|---|---|---|
| Parameter | Coal (102) | Condenser Knockout (110) | Partially Concentrated Product Gas (107) | Membrane Feed (108) | Air Sweep (101) | Gas to Combustor (103) | Retentate (109) |
| Total Flow (kg/h) | 55 | 51 | 456 | 912 | 1090 | 1364 | 638.1 |
| Temperature (° C.) | 25 | 40 | 40 | 40 | 25 | 35 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 16.0 | 7.3 |
| Nitrogen | 0 | 0 | 67.8 | 67.8 | 79.0 | 66.5 | 89.6 |
| Carbon Dioxide | 0 | 0 | 21.8 | 21.8 | 0 | 12.7 | 3.1 |
| Water | 0 | 100 | 7.4 | 7.4 | 0 | 4.8 | 0 |

Compared to Example 4, the carbon dioxide content of the partially concentrated product gas, 107, remained high (21.8 vol %). The oxygen content of the combustion exhaust stream, 108, was raised to almost 3 vol %, and the carbon dioxide content of the treated flue gas, 109, was reduced to a much lower level of 3.1 vol %. The process achieves about 82% recovery of carbon dioxide. The cost of transporting the carbon dioxide exhaust gas to some off-site use is cut almost in half compared to the cost of transporting untreated flue gas.

Example 6

Process of the Invention with Split Ratio 1:4

In this example, the split ratio was changed to 1:4; that is, four volumes of exhaust gas were assumed to be sent to the membrane separation step for every volume of exhaust gas sent to the algae farm or enhanced oil recovery process. The membrane area was again assumed to be 400 m², and the air flow rate in stream 101 was assumed to be the base case calculation value of 950 kg/h. The results of the calculation are shown in Table 7.

TABLE 7

| | Stream | | | | | | |
|---|---|---|---|---|---|---|---|
| Parameter | Coal (102) | Condenser Knockout (110) | Partially Concentrated Product Gas (107) | Membrane Feed (108) | Air Sweep (101) | Gas to Combustor (103) | Retentate (109) |
| Total Flow (kg/h) | 55 | 59 | 236 | 942 | 950 | 1182 | 710 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |
| Oxygen | 0 | 0 | 1.6 | 1.6 | 21.0 | 16.4 | 3.8 |
| Nitrogen | 0 | 0 | 68.5 | 68.5 | 79.0 | 66.3 | 86.8 |
| Carbon Dioxide | 0 | 0 | 22.5 | 22.5 | 0 | 11.8 | 9.1 |
| Water | 0 | 100 | 7.4 | 7.4 | 0 | 5.5 | 0.3 |

Increasing the relative volume of exhaust gas being treated in the membrane separation step results in a further increase in the carbon dioxide content of the partially concentrated product gas, 107, to 22.5 vol %; however, the oxygen content of the combustion exhaust stream, 108, is low (1.6 vol %) and the carbon dioxide content of the treated flue gas, 109, is high (9.1 vol %).

Example 7

Process of the Invention

As with Example 5, the membrane area and air intake were assumed to be increased to balance the less desirable effects of decreasing the split ratio. In this example the membrane area was assumed to be increased to 1,600 m², and the air flow, 101, was assumed to be increased to 1,200 kg/h. Other parameters are as in Example 6, including a split ratio of 1:4. The results of the calculation are shown in Table 8

TABLE 8

| | Stream | | | | | | |
|---|---|---|---|---|---|---|---|
| Parameter | Coal (102) | Condenser Knockout (110) | Partially Concentrated Product Gas (107) | Membrane Feed (108) | Air Sweep (101) | Gas to Combustor (103) | Retentate (109) |
| Total Flow (kg/h) | 55 | 56 | 340 | 1361 | 1200 | 1702 | 859 |
| Temperature (° C.) | 25 | 40 | 40 | 40 | 25 | 37 | 25 |
| Pressure (bar) | 1.0 | 1.0 | 1.0 | 1.0 | 1.0 | 1.0 | 1.0 |
| Component (vol %) | | | | | | | |
| Coal (carbon + hydrogen) | 100 | 0 | 0 | 0 | 0 | 0 | 0 |

TABLE 8-continued

| Parameter | Stream | | | | | | |
|---|---|---|---|---|---|---|---|
| | Coal (102) | Condenser Knockout (110) | Partially Concentrated Product Gas (107) | Membrane Feed (108) | Air Sweep (101) | Gas to Combustor (103) | Retentate (109) |
| Oxygen | 0 | 0 | 2.9 | 2.9 | 21.0 | 13.6 | 8.5 |
| Nitrogen | 0 | 0 | 62.0 | 62.0 | 79.0 | 60.8 | 88.1 |
| Carbon Dioxide | 0 | 0 | 27.7 | 27.7 | 0 | 19.9 | 3.3 |
| Water | 0 | 100 | 7.4 | 7.4 | 0 | 5.7 | 0.1 |

The combination of the lowered split ratio, increased membrane area, and increased air flow rate resulted in an increase of the carbon dioxide content of the partially concentrated product gas, 107, to 27.7 vol %. The oxygen content of the combustion exhaust stream, 108, was about 3 vol %, and the carbon dioxide content of the treated flue gas was lowered to 3.3 vol %. The process achieves about 75% carbon dioxide recovery.

Example 8

Process of the Invention with Addition of Oxygen

The process of the invention was assumed to be carried out as in Example 7. The only difference was that the an intake via the permeate sweep line was assumed to be at the base case flow rate value of 950 kg/h, and an additional 50 kg/h of pure oxygen was assumed to be introduced directly into the combustor as stream 115. The results of the calculation are shown in Table 9.

TABLE 9

| Parameter | Stream | | | | | | | |
|---|---|---|---|---|---|---|---|---|
| | Coal (102) | $O_2$ (101) | Condenser Knockout (110) | Partially Conc'd Product Gas (107) | Membrane Feed (108) | Air Sweep (101) | Gas to Combustor (103) | Retentate (109) |
| Total Flow (kg/h) | 55 | 50 | 58 | 306 | 1225 | 950 | 1485 | 690.4 |
| Temperature (° C.) | 25 | 25 | 40 | 40 | 40 | 25 | 37 | 25 |
| Pressure (bar) | 1.0 | 1.0 | 1.0 | 1.0 | 1.0 | 1.0 | 1.0 | 1.0 |
| Component (vol %) | | | | | | | | |
| Coal (carbon + hydrogen) | 100 | 0 | 0 | 0 | 0 | 0 | 0 | 0 |
| Oxygen | 0 | 100 | 0 | 3.0 | 3.0 | 21.0 | 12.4 | 9.7 |
| Nitrogen | 0 | 0 | 0 | 56.1 | 56.1 | 79.0 | 56.4 | 87.0 |
| Carbon Dioxide | 0 | 0 | 0 | 33.5 | 33.5 | 0 | 25.2 | 3.3 |
| Water | 0 | 0 | 100 | 7.4 | 7.4 | 0 | 6.0 | 0 |

With addition of make-up oxygen, the carbon dioxide content of the partially concentrated gas product, 107, is increased to 33.5 vol %. The oxygen content of the combustion exhaust stream, 108, is 3.0 vol %, and the carbon dioxide content of the treated flue gas, 109, is 3.3 vol %. The process achieves about 80% carbon dioxide recovery.

Example 9-10

Process of the Invention with Compression of Membrane Feed Stream

The calculations for Examples 9 and 10 were performed using the flow scheme shown in FIG. 2 and described in the Detailed Description, above. The flow scheme shown in FIG. 2 is a variant of the flow scheme shown in FIG. 1, in which the portion of the exhaust stream, 208, being routed to the sweep-based membrane separation step, 211, is passed through a compressor, 219, prior to being sent to the membrane separation step, 211.

Example 9

Process of the Invention with Split Ratio 1:4

A calculation was performed using the results of Example 7 as basis, and again assuming a split ratio of 1:4. Iterative calculations showed that use of feed compression to 2 bar enables the membrane area to be reduced to 500 m², and the air flow, 201, to be reduced to 1050 kg/h. The results of the calculation are shown in Table 10.

TABLE 10

| Parameter | Stream | | | | | | |
|---|---|---|---|---|---|---|---|
| | Coal (202) | Condenser Knockout (210) | Partially Concentrated Gas Product (207) | Membrane Feed (208) | Air Sweep (201) | Gas to Combustor (203) | Retentate (209) |
| Total Flow (kg/h) | 55 | 63 | 327 | 1309 | 1050 | 1644 | 715 |
| Temperature (° C.) | 25 | 30 | 30 | 45 | 25 | 40 | 25 |
| Pressure (bar) | 1.0 | 1.0 | 1.0 | 2.0 | 1.0 | 1.0 | 2.0 |
| Component (vol %) | | | | | | | |
| Coal (carbon + hydrogen) | 100 | 0 | 0 | 0 | 0 | 0 | 0 |
| Oxygen | 0 | 0 | 2.9 | 2.9 | 21.0 | 14.3 | 5.9 |
| Nitrogen | 0 | 0 | 60.7 | 60.7 | 79.0 | 58.9 | 91.2 |
| Carbon Dioxide | 0 | 0 | 32.1 | 32.1 | 0 | 23.5 | 2.9 |
| Water | 0 | 100 | 4.3 | 4.3 | 0 | 3.3 | 0 |

The carbon dioxide content of the partially concentrated gas product, 207, is 32.1 vol %. The oxygen content of the combustion exhaust stream, 208, is just under 3 vol, and the carbon dioxide content of the treated flue gas, 209, is 2.9 vol %. Recovery of carbon dioxide is about 85%.

Example 10

Process of the Invention with Split Ratio 1:10

This Example illustrates the combined effect of slight compression and a low split ratio of 1:10. The calculation was performed assuming a membrane area of 600 m², and an intake air flow rate in stream 201 of 1,150 kg/h. The assumption for membrane area and air intake flow rate are higher than for Example 9, to balance the lower split ratio. The results of the calculation are shown in Table 11.

TABLE 11

| Parameter | Stream | | | | | | |
|---|---|---|---|---|---|---|---|
| | Coal (202) | Condenser Knockout (210) | Partially Concentrated Gas Product (207) | Membrane Feed (208) | Air Sweep (201) | Gas to Combustor (203) | Retentate (209) |
| Total Flow (kg/h) | 55 | 65 | 232 | 2085 | 1150 | 2327 | 909 |
| Temperature (° C.) | 25 | 30 | 30 | 45 | 25 | 43 | 25 |
| Pressure (bar) | 1.0 | 1.0 | 1.0 | 2.0 | 1.0 | 1.0 | 2.0 |
| Component (vol %) | | | | | | | |
| Coal (carbon + hydrogen) | 100 | 0 | 0 | 0 | 0 | 0 | 0 |
| Oxygen | 0 | 0 | 3.2 | 3.2 | 21.0 | 11.7 | 7.2 |
| Nitrogen | 0 | 0 | 50.1 | 50.1 | 79.0 | 48.9 | 89.3 |
| Carbon Dioxide | 0 | 0 | 42.4 | 42.4 | 0 | 35.7 | 3.5 |
| Water | 0 | 100 | 4.3 | 4.3 | 0 | 3.7 | 0 |

The carbon dioxide content of the partially concentrated gas product, 207, is increased to 42.4 vol %. The oxygen content of the combustion exhaust stream, 208, is 3.2 vol %, and the carbon dioxide content of the treated flue gas, 209, is 3.5 vol %. The recovery of carbon dioxide in this case drops to about 65%.

We claim:

1. A membrane process for treating flue gas, comprising:
   (a) performing a combustion step by combusting a mixture of a fuel and air, oxygen enriched air, or oxygen, thereby creating an exhaust stream comprising carbon dioxide and nitrogen;
   (b) splitting the exhaust stream into a first portion and a second portion without adjusting the composition of either portion;
   (c) providing a membrane having a feed side and a permeate side, and being selectively permeable to carbon dioxide over nitrogen and to carbon dioxide over oxygen;
   (d) performing a membrane separation step, comprising,
      (i) passing a first portion of the exhaust stream across the feed side;
      (ii) passing air, oxygen-enriched air, or oxygen as a sweep stream across the permeate side,
      (iii) withdrawing from the feed side a carbon dioxide-depleted vent stream, and
      (iv) withdrawing from the permeate side a permeate stream comprising oxygen and carbon dioxide;

(e) passing at least a portion of the permeate stream to step (a) as at least part of the air, oxygen-enriched air, or oxygen used in step (a), thereby forming a gas-flow loop between the combustion step and the membrane separation step;

(f) withdrawing a second portion of the exhaust stream from a point in the gas flow loop downstream of the combustion step and upstream of the membrane separation step; and (g) using, storing, or otherwise disposing of the second portion in a confined manner.

2. The process of claim 1, wherein the second portion is transported to a confining operation, where it is used, stored, or otherwise disposed of in a confined manner.

3. The process of claim 1, wherein the second portion is used for enhanced oil recovery.

4. The process of claim 1, wherein the second portion is used for enhanced coalbed or coal mine methane recovery.

5. The process of claim 1, wherein the second portion is used in the production of carbonates.

6. The process of claim 1, wherein the second portion is injected into subsurface water.

7. The process of claim 1, wherein the second portion comprises at least 20 vol % $CO_2$.

8. The process of claim 7, wherein the second portion comprises at least 30 vol % $CO_2$.

9. The process of claim 8, wherein the second portion comprises at least 40 vol % $CO_2$.

10. The process of claim 7, wherein the second portion comprises less than 60 vol % $CO_2$.

11. The process of claim 1, wherein the second portion comprises at least 3 vol % oxygen.

12. The process of claim 1, wherein between about 10 vol % and 50 vol % of the exhaust stream is withdrawn from the gas flow loop as the second portion.

13. The process of claim 1, wherein the first portion is compressed to a pressure of up to about 5 bar before being passed across the feed side of the membrane.

14. The process of claim 1, wherein the membrane exhibits a carbon dioxide permeance of at least 500 gpu under process operating conditions.

15. The process of claim 1, wherein the membrane exhibits a selectivity in favor of carbon dioxide over nitrogen of at least 10 under process operating conditions.

16. The process of claim 1, wherein the vent stream comprises 3 vol % carbon dioxide or less.

17. The process of claim 16, wherein the vent stream comprises 2 vol % carbon dioxide or less.

18. The process of claim 1, wherein the membrane comprises two or more membranes, and the two or more membranes are arranged in one or more modules, and wherein the one or more modules are arranged in a vertical configuration.

19. A membrane process for treating flue gas, comprising:
(a) performing a combustion step by combusting a mixture of a fuel and air, oxygen-enriched air, or oxygen, thereby creating an exhaust stream comprising carbon dioxide and nitrogen;
(b) splitting the exhaust stream into a first portion and a second portion without adjusting the composition of either portion;
(c) providing a membrane having a feed side and a permeate side, and being selectively permeable to carbon dioxide over nitrogen and to carbon dioxide over oxygen;
(d) performing a membrane separation step, comprising,
  (i) passing a first portion of the exhaust stream across the feed side,
  (ii) passing air, oxygen-enriched air, or oxygen as a sweep stream across the permeate side,
  (iii) withdrawing from the feed side a carbon dioxide-depleted vent stream, and
  (iv) withdrawing from the permeate side a permeate stream comprising oxygen and carbon dioxide;
(e) passing at least a portion of the permeate stream to step (a) as at least part of the air, oxygen-enriched air, or oxygen used in step (a), thereby forming a gas-flow loop between the combustion step and the membrane separation step;
(f) withdrawing a second portion of the exhaust stream from a point in the gas flow loop downstream of the combustion step and upstream of the membrane separation step; and
(g) using the second portion for enhanced oil recovery.

20. The process of claim 19, wherein the second portion comprises at least 30 vol % $CO_2$.

21. The process of claim 20, wherein the second portion comprises at least 40 vol % $CO_2$.

22. The process of claim 21, wherein the second portion comprises at least 50 vol % $CO_2$.

* * * * *